(12) United States Patent
Grant

(10) Patent No.: US 11,902,420 B2
(45) Date of Patent: Feb. 13, 2024

(54) PARTIAL CRYPTOGRAPHIC KEY TRANSPORT USING ONE-TIME PAD ENCRYPTION

(71) Applicant: Theon Technology LLC, Newport Beach, CA (US)

(72) Inventor: Robert Edward Grant, Laguna Beach, CA (US)

(73) Assignee: THEON TECHNOLOGY LLC, Newport Beach, CA (US)

( * ) Notice: Subject to any disclaimer, the term of this patent is extended or adjusted under 35 U.S.C. 154(b) by 115 days.

(21) Appl. No.: 17/533,374

(22) Filed: Nov. 23, 2021

(65) Prior Publication Data
US 2023/0163953 A1    May 25, 2023

(51) Int. Cl.
*H04L 9/06* (2006.01)
*G06K 19/06* (2006.01)

(52) U.S. Cl.
CPC ...... *H04L 9/0656* (2013.01); *G06K 19/06037* (2013.01)

(58) Field of Classification Search
CPC .......... H04L 9/0656; G06K 19/06037
See application file for complete search history.

(56) References Cited

U.S. PATENT DOCUMENTS

| | | | |
|---|---|---|---|
| 5,033,352 A | 7/1991 | Kellogg |
| 5,764,772 A | 6/1998 | Kaufman |
| 5,966,445 A | 10/1999 | Park |
| 6,072,876 A | 6/2000 | Obata |
| 6,154,541 A | 11/2000 | Zhang |
| 6,396,928 B1 | 5/2002 | Zheng |
| 6,480,605 B1 | 11/2002 | Uchiyama |
| 6,636,968 B1 | 10/2003 | Rosner |
| 6,751,736 B1 | 6/2004 | Bowman |
| 6,763,364 B1 | 7/2004 | Wilber |
| 6,990,200 B1 | 1/2006 | Kasahara |
| 7,502,754 B2 | 3/2009 | Campbell |
| 8,468,244 B2 | 6/2013 | Redlich |
| 8,516,244 B2 | 8/2013 | Waters |
| 8,885,820 B1 | 11/2014 | Ambert |
| 9,450,749 B2 | 9/2016 | Hammersmith |
| 10,230,703 B1 | 3/2019 | Lepore |
| 10,476,665 B1 | 11/2019 | Griffin |

(Continued)

FOREIGN PATENT DOCUMENTS

| | | |
|---|---|---|
| EP | 1220174 | 7/2002 |
| EP | 2680488 | 8/2019 |

(Continued)

OTHER PUBLICATIONS

Bhaumik, et al. "Safely Doubling your Block Ciphers for a Post-Quantum World," Inria, Paris. 2020. 49 pages.

(Continued)

*Primary Examiner* — Meng Li
(74) *Attorney, Agent, or Firm* — Fish IP Law, LLP

(57) ABSTRACT

A method of securely encrypting data whereby a computing device can utilize a seed and a pin to generate a mantissa of an irrational number. The computing device can then utilize a portion of the mantissa as a one-time pad to encrypt data. The seed can be transmitted to a recipient via a graphical code to enable secure decryption by a recipient's computing device.

19 Claims, 2 Drawing Sheets

(56) References Cited

U.S. PATENT DOCUMENTS

| | | |
|---|---|---|
| 10,911,451 B2 | 2/2021 | Costa |
| 11,188,977 B2 | 11/2021 | Youb |
| 11,233,636 B1* | 1/2022 | Peddada .............. H04L 9/0841 |
| 11,258,617 B1* | 2/2022 | Peddada .............. H04L 9/0838 |
| 11,443,310 B2 | 9/2022 | Bolla |
| 2003/0016823 A1* | 1/2003 | Chung ................. H04L 9/0662 380/46 |
| 2003/0081785 A1 | 5/2003 | Boneh |
| 2003/0112972 A1* | 6/2003 | Hattick ................ H04L 9/0656 380/46 |
| 2003/0115449 A1 | 6/2003 | Yochim |
| 2004/0096056 A1 | 5/2004 | Boren |
| 2005/0271207 A1 | 12/2005 | Frey |
| 2006/0072745 A1 | 4/2006 | Fukaya |
| 2007/0064930 A1* | 3/2007 | Fischer .................. H04L 9/003 380/28 |
| 2007/0211893 A1 | 9/2007 | Frosik |
| 2008/0107274 A1 | 5/2008 | Worthy |
| 2008/0208560 A1 | 8/2008 | Johnson |
| 2010/0119061 A1 | 5/2010 | Kawale |
| 2012/0134495 A1* | 5/2012 | Liu ....................... H04L 9/0656 380/46 |
| 2013/0142323 A1* | 6/2013 | Chiarella ................. G06F 7/58 380/28 |
| 2013/0297937 A1 | 11/2013 | Fransen |
| 2013/0315388 A1 | 11/2013 | Chiarella |
| 2014/0112469 A1* | 4/2014 | Layne ..................... H04L 9/065 380/44 |
| 2016/0012252 A1* | 1/2016 | Deleeuw ............ G06F 21/6254 726/26 |
| 2017/0078087 A1* | 3/2017 | Chalker ................... H04L 9/16 |
| 2017/0222804 A1 | 8/2017 | Dewitt |
| 2017/0302446 A1* | 10/2017 | Thorwirth .......... H04N 21/2347 |
| 2017/0310650 A1 | 10/2017 | McMullen |
| 2018/0101322 A1 | 4/2018 | Cheriton |
| 2018/0131526 A1 | 5/2018 | Ellingson |
| 2019/0036678 A1 | 1/2019 | Ahmed |
| 2019/0089532 A1 | 3/2019 | Lambert |
| 2019/0120929 A1 | 4/2019 | Meadow |
| 2019/0238323 A1 | 8/2019 | Bunch |
| 2020/0084037 A1 | 3/2020 | Zhang |
| 2020/0241841 A1 | 7/2020 | Tamiya |
| 2020/0293212 A1 | 9/2020 | Narayanamurthy |
| 2020/0366652 A1 | 11/2020 | Koyun |
| 2020/0396059 A1 | 12/2020 | Micali |
| 2021/0312055 A1 | 10/2021 | Kloth |
| 2023/0007439 A1 | 1/2023 | Williams |

FOREIGN PATENT DOCUMENTS

| | | |
|---|---|---|
| JP | 2007157288 | 6/2007 |
| WO | 00/65768 | 11/2000 |
| WO | 0065768 | 11/2000 |
| WO | 2005085992 | 9/2005 |
| WO | 2016203762 | 12/2016 |
| WO | 2019110955 | 6/2019 |

OTHER PUBLICATIONS

"Elliptic Curve Cryptography (Ecc)." 1 page.

"Elliptic Curve Over Finite Non-Prime Fields," Mathematics. 2 pages.

"Golden Ratio Calculator," Good Calculators. 2 pages.

Grant, et al. "Accurate and Infinite Prime Prediction from Novel Quasi-Prime Analytical Methodology." 8 pages.

Grant, Robert E. "Prime Number Pattern Discovery," Discoveries, Publications, Unified Math/Physics. Jul. 2018. 6 pages.

Kumar, et al. "A Symmetric Mecial Image Encryption Scheme Based on Irrational Numbers," Biomed Res 2018 Special Issue. S494-S498. 5 pages.

Grant, et al. "Reciprocal Wave Factorization," Strathspey Crown Holdings. Jun. 2020. 19 pages.

Barker, et al. "Recommendation for Pair-Wise Key Establishment Schemes Using Discrete Logarithm Cryptography," NIST. Apr. 2018. 2 pages.

Weisstein, Eric W. "Taniyama-Shimura Conjecture," Mathworld—A Wolfram Web Resource. 3 pages.

Wang, et al. "A Decentralized Electricity Transaction Mode of Microgrid Based on Blockchain and Continuous Double Action," IEEE. 2018. 5 pages.

"Why Are Elliptic Curves Constructed Using Prime Fields and Not Composite Fields?" https://crypto.stackexchange.com. 3 pages.

"Why is a Prime Number Used in ECDSA?" https://crypto.stackexchange.com/. 3 pages.

Wu, et al. "Forensic Analysis of Bitcoin Transactions," IEEE. 2019. 3 pages.

Burd, Barry. "A New Approach to Condensing Data Leads to a 99% Compression Rate," TechTarget. May 2015. 9 pages.

Zhang, et al. "A Blockchain-Based Authentication Method with One-Time Password," IEEE, 2019. 9 pages.

Kumar, et al. "A symmetric medical image encryption scheme based on irrational numbers," Biomedical Research 2018; Special Issue: S494-S498. 5 pages.

\* cited by examiner

PARTIAL CRYPTOGRAPHIC KEY TRANSPORT USING ONE-TIME PAD ENCRYPTION

FIELD OF THE INVENTION

The field of the invention is data protection.

BACKGROUND

The background description includes information that may be useful in understanding the present invention. It is not an admission that any of the information provided herein is prior art or relevant to the presently claimed invention, or that any publication specifically or implicitly referenced is prior art.

Data security has long been a concern of computer users everywhere. To protect data, users often rely on encryption schemes. However, encryption schemes suffer from several deficiencies. For example, keys can be intercepted and used by intruders to decrypt the data.

Additionally, the advent of quantum computing means it is only a matter of time until traditional encryption schemes, regardless of key size or whether it employs private keys, are rendered obsolete.

Thus, there is still a need for a reliable, future proof method of securing data for transmission and storage.

Thus, there is still a need for key generation for encryption and decryption that is fast, secure and tamper-proof.

SUMMARY OF THE INVENTION

The inventive subject matter provides apparatus, systems and methods in which a computing device utilizes a seed and a pin to generate a mantissa of an irrational number. A portion of the mantissa is then used as a one-time pad to encrypt data. The seed can then be used by the computing device or another computing device as a first portion of a key and the pin can be used at least a second portion of the key.

In embodiments, the irrational number is a root of a number that involves the seed and the pin. It can be a square root, a cube root or a fractional root.

In embodiments, the computing device can generate the mantissa by applying the seed and pin to a mathematical function that generates a value that is to be used to generate the irrational number.

Once the data is encrypted, the seed can be utilized as a first portion of a key that can be used to decrypt the data. Likewise, the pin can be utilized as a second portion of this key. The seed can be embedded or otherwise included in a graphical code (such as a QR code) that is transmitted to a recipient, where the recipient computing device can then generate the decryption key.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
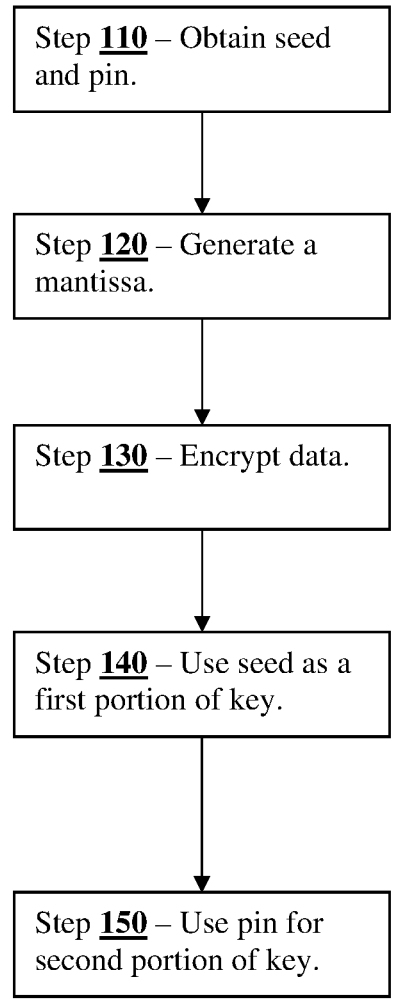
FIG. 1 is a flowchart of view of processes executed by a computing device, according to embodiments of the inventive subject matter.

FIG. 1 shows a flowchart of a method of securing data, according to embodiments of the inventive subject matter.

At step 110, a computing device obtains a seed and a pin. The seed can be selected in several ways.

In embodiments, the seed is selected randomly from among numbers that are neither prime numbers nor quasi-prime numbers.

In embodiments, the seed is randomly selected from among a plurality of numbers that are over a thousand digits long. In other embodiments, the seed is randomly selected from among a plurality of numbers that are over ten thousand digits long.

At step 120, the computing device uses the seed and the pin to generate a portion of mantissa of an irrational number. The irrational number is a root of a number comprising the seed and the pin.

In embodiments, the root can be a square root or a cube root. In other embodiments, the root can be a fractional root.

In embodiments, the computing device concatenates the seed and the pin to generate a combined value. For example, if a seed is 12345 and the pin is 4321, the concatenated value would be 123454321. Then, the root of the number is taken to generate the mantissa.

In embodiments, the irrational number can be a root of a number that comprises the seed and the pin, and that ends in 2, 3, 7 or 8. Thus, taking the number of the example above, in these embodiments the number could be 1234543217. The root of this number is then taken to generate the mantissa.

In embodiments, the mantissa is generated by applying the seed and the pin to a mathematical function. The mathematical function can be an addition function, a subtraction function, a multiplication function, or a division function. The root is then taken from the outcome of the function to generate the mantissa.

Figure 2:
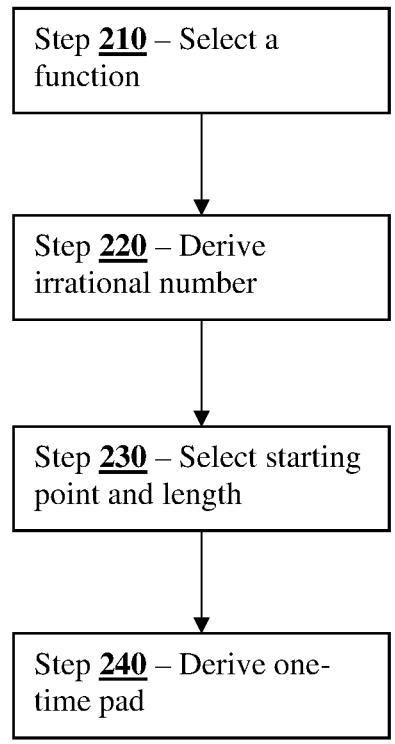
FIG. 2 is a flowchart that details the generation of a one-time pad in detail, according to embodiments of the inventive subject matter.

FIG. 2 illustrates the processes associated with encrypting a set of data according to embodiments of the inventive subject matter. Steps 210-260 cover the process of encrypting a message or data.

At step 210, the computing device selects a function to be used to obtain a mantissa. The function can be a mathematical function or algorithm as discussed further herein. The function can be selected according to a pre-determined order or schedule. Alternatively, it can be randomly selected or user-selected. The computing device obtains the selected function from the stored functions in a functions database.

At some point prior to step 220, the computing device also obtains a seed and a pin, as discussed above.

At step 220, the computing device solves the function using the seed and pin to obtain the mantissa of an irrational number. An irrational number has an infinite or near-infinite amount of decimal places. Thus, the function is a function whose output is an irrational number. By using an irrational, the systems and methods of the inventive subject matter have the flexibility to obtain many encryption keys from the same function without repeating some or all of the encryption keys. Because irrational numbers do not have a pattern, the systems and methods of the inventive subject matter can ensure true randomness in the generation of cryptography keys. For example, the function can be to take the square root of a non-perfect square number. This results in an irrational number. In an illustrative example, the function to be solved can be the square root of 20.

At step 230, the computing device selects a starting point and a length. The starting point designates a start digit in the mantissa. The length designates the number of digits following the start digit. The start digit and length are preferably integer values such that they identify a precise digit location and precise length.

At step 240, the computing device applies the starting point and length to the decimals of the mantissa to result in one-time pad or cryptographic key, which is a portion of the mantissa. Thus, the one-time pad is a key that starts at the start digit and contains the digits following the start digit according to the length.

In embodiments, the one-time pad can be at least 10,000 digits long. In other embodiments, the one-time pad comprises at least as many digits as data positions in the data. In still other embodiments, the binary representation of the one-time pad comprises at least as many digits as the binary representation of the data to be encrypted.

The techniques used to generate and use the encryption/decryption keys using a mathematical function are described in greater detail in the inventor's own pending U.S. patent application, U.S. Ser. No. 17/018,582 filed Sep. 11, 2020, entitled "Method of Storing and Distributing Large Keys", which is incorporated herein by reference in its entirety.

At step 130, the computing device uses the generated portion of the mantissa as a one-time pad to encrypt data.

The encrypted data can then be stored by the computing device locally or at a remote database.

At step 140, the seed can be used as the first portion of the key.

At step 150, the pin can be used as the second portion of the key.

In a variation of these embodiments, the first portion of the key includes a start point of the one-time pad within the mantissa, which is utilized as discussed above in the discussion of FIG. 2. In a variation of these embodiments, the PIN could designate the length.

In embodiments, the first portion (which can be or can include the seed) can be distributed via a graphical code. This graphical code could be a QR code. In a variation of these embodiments, the QR code can contain additional codes that help to obfuscate the public key.

To decrypt the encrypted data at a future time, the computing device (or another computing device that is the recipient of the encrypted data) can apply the same seed and pin to the function to generate the mantissa and one-time pad as discussed above, to generate an identical key that can be used for decryption.

In situations where a receiving computing device is decrypting the data, the sending computing device can send the seed and an indicator of a pin and a function. The receiving computing device would already have these pins and function (or pointers to these pins and functions) stored as part of an initial shared secret established prior to the data transmission. The seed can be transmitted as part of a graphical code as discussed above.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of securing data, comprising:
   using, by a computing device, a seed and a pin to generate a portion of a mantissa of an irrational number;
   using, by the computing device, the portion of the mantissa as a one-time pad;
   encrypting, by the computing device, the data with the one-time pad;
   utilizing, by the computing device, the seed as a first portion of a key;
   utilizing, by the computing device, the pin as at least part of a second portion of the key:,
   generating, by at least one of the computing device or a second computing device, a decryption key from the first potion of the key and the second portion of the key; and
   decrypting, by the at least one of the computing device and the second computing device, the data using the decryption key.

2. The method of claim 1, wherein the irrational number is a root of a number comprising the seed and pin.

3. The method of claim 2, wherein the root is a square root or a cube root.

4. The method of claim 2, wherein the root is a fractional root.

5. The method of claim 1, wherein the irrational number is a root of a number comprising the seed and the pin, and ending in 2, 3, 7, or 8.

6. The method of claim 1, further comprising using a concatenation of the seed and the pin to generate the portion of the mantissa.

7. The method of claim 1, further comprising using a mathematical function of the seed and the pin to generate the portion of the mantissa.

8. The method of claim 7, wherein the mathematical function comprises addition or subtraction.

9. The method of claim 7, wherein the mathematical function comprises multiplication or division.

10. The method of claim 1, further comprising randomly selecting the seed from among numbers that are neither primes nor quasi-primes.

11. The method of claim 1, further comprising randomly selecting the seed from among numbers that are over a thousand digits.

12. The method of claim 1, further comprising randomly selecting the seed from among numbers that are over ten thousand digits.

13. The method of claim 1, wherein the one-time pad comprises at least 10,000 digits.

14. The method of claim 1, wherein the one-time pad comprises at least as many digits as data positions in the data.

15. The method of claim 1, wherein a binary representation of the one-time pad comprises at least as many digits as digits in a binary representation of the data.

16. The method of claim 1, further comprises using a graphical code to distribute a public key.

17. The method of claim 16, wherein the graphical code comprises a QR code.

18. The method of claim 17, further comprising confounding the QR code with at least one code other than the public key.

19. The method of claim 1, wherein the first portion of the key includes a start point of the one-time pad within the mantissa.

* * * * *